Dec. 2, 1930.         W. R. MORRIS         1,783,887
HYDRAULIC POWER DEVICE
Filed March 7, 1928      6 Sheets-Sheet 2

INVENTOR
W. R. Morris
BY
ATTORNEY

Dec. 2, 1930.                    W. R. MORRIS                    1,783,887
                            HYDRAULIC POWER DEVICE
                     Filed March 7, 1928          6 Sheets-Sheet 3
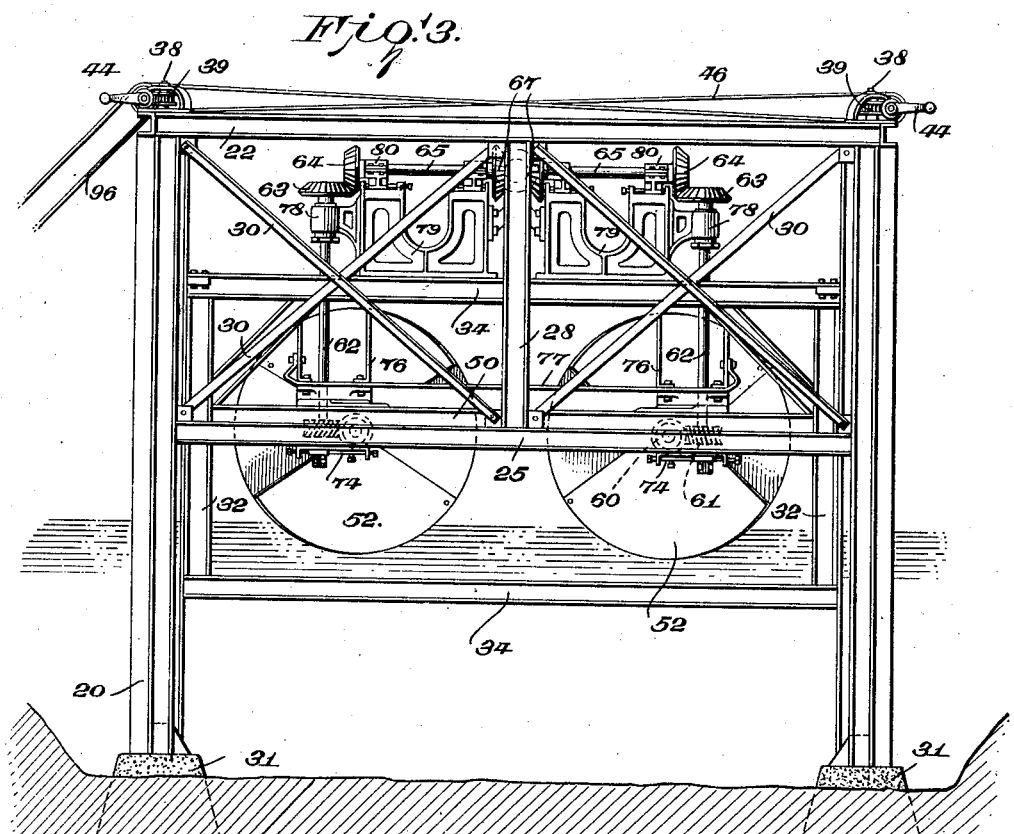
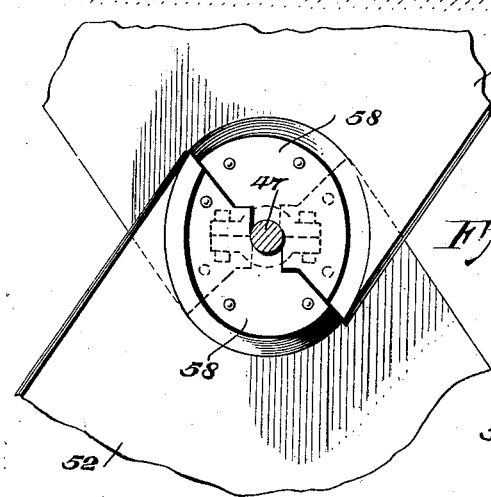
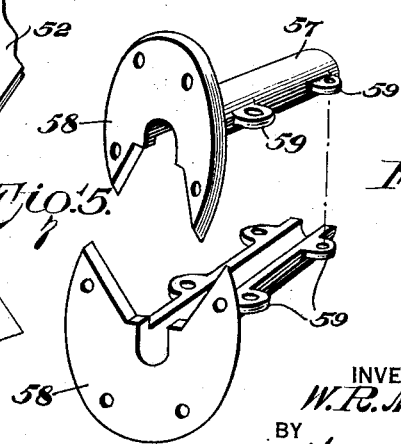
INVENTOR
W. R. Morris
BY
ATTORNEY Dec. 2, 1930.                W. R. MORRIS                1,783,887
                        HYDRAULIC POWER DEVICE
                    Filed March 7, 1928      6 Sheets-Sheet 4
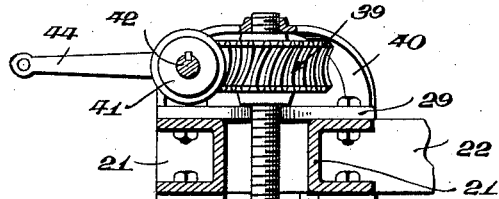
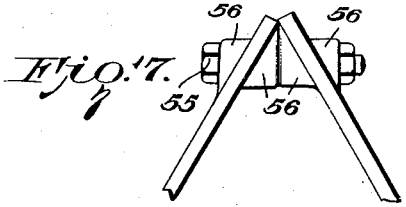
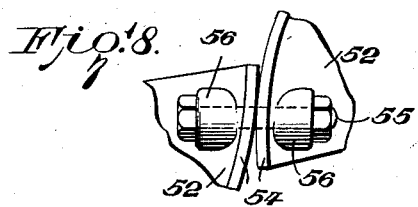
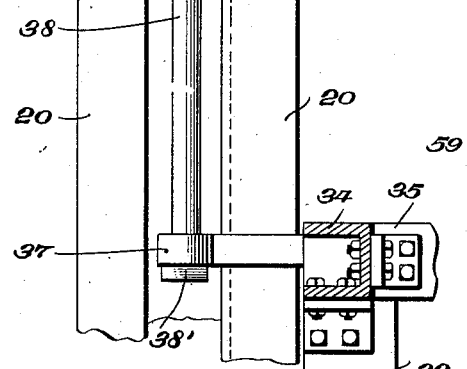
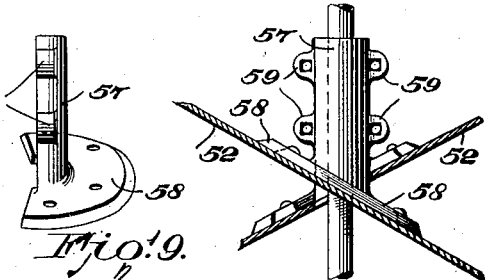
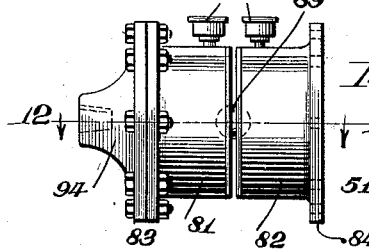
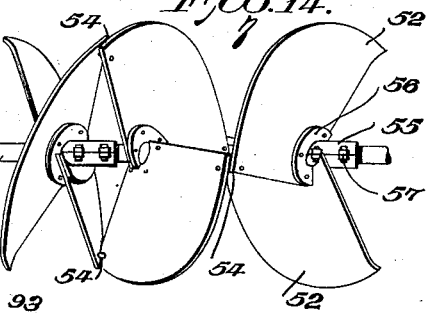
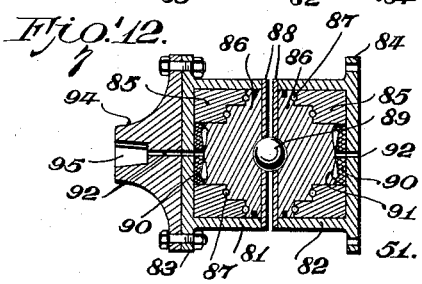
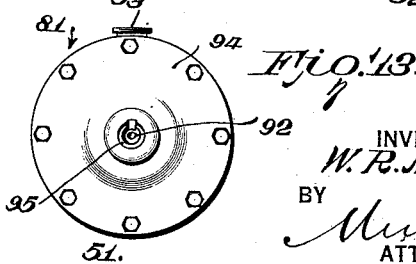
INVENTOR
W. R. Morris.
BY
ATTORNEY Dec. 2, 1930.  W. R. MORRIS  1,783,887
HYDRAULIC POWER DEVICE
Filed March 7, 1928   6 Sheets-Sheet 5

INVENTOR
W. R. Morris.
BY
ATTORNEY

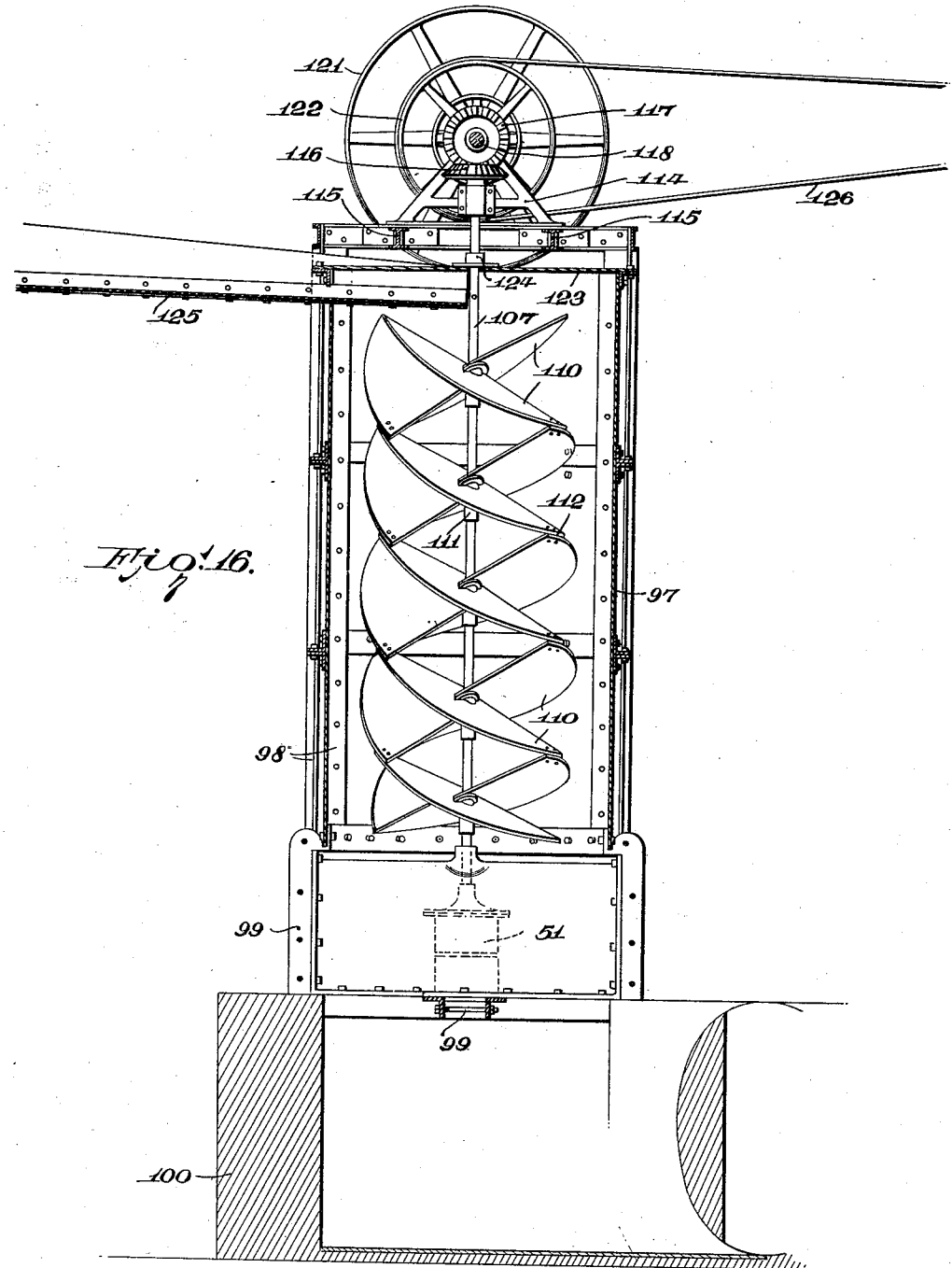

Patented Dec. 2, 1930

1,783,887

UNITED STATES PATENT OFFICE

WILLIAM R. MORRIS, OF FAIRFIELD, IDAHO, ASSIGNOR OF ONE-HALF TO ROBERT HENRY MORRIS AND ONE-HALF TO RAYMOND GUY MORRIS, BOTH OF BOISE, IDAHO

HYDRAULIC POWER DEVICE

Application filed March 7, 1928. Serial No. 259,886.

REISSUED

This invention relates to improvements in hydraulic power devices generally, and more particularly to a type of such devices for the utilizing of the power from the current of flowing streams.

The principal object of the invention is to provide for a mechanism adapted to be installed in a flowing stream, or at a fall of such a stream, as the case may be, for the purpose of generating a maximum of power from the force and pressure of the water flow, and with a minimum of power loss in the mechanism from friction.

A further object of the invention is to provide for a water motor of the type as hereinbefore characterized, and one including an improved mechanism for transmitting the power generated by the motor from the same and to the point or points of use.

Another object of the invention is to provide for an improved method and manner of cutting, shaping and mounting the several blades of an impeller structure, such as will permit it to operate at highest efficiency in translating the force and pressure of the current or fall of a stream into mechanical power to be delivered from the mechanism driven thereby for general power purposes.

Figure 1:
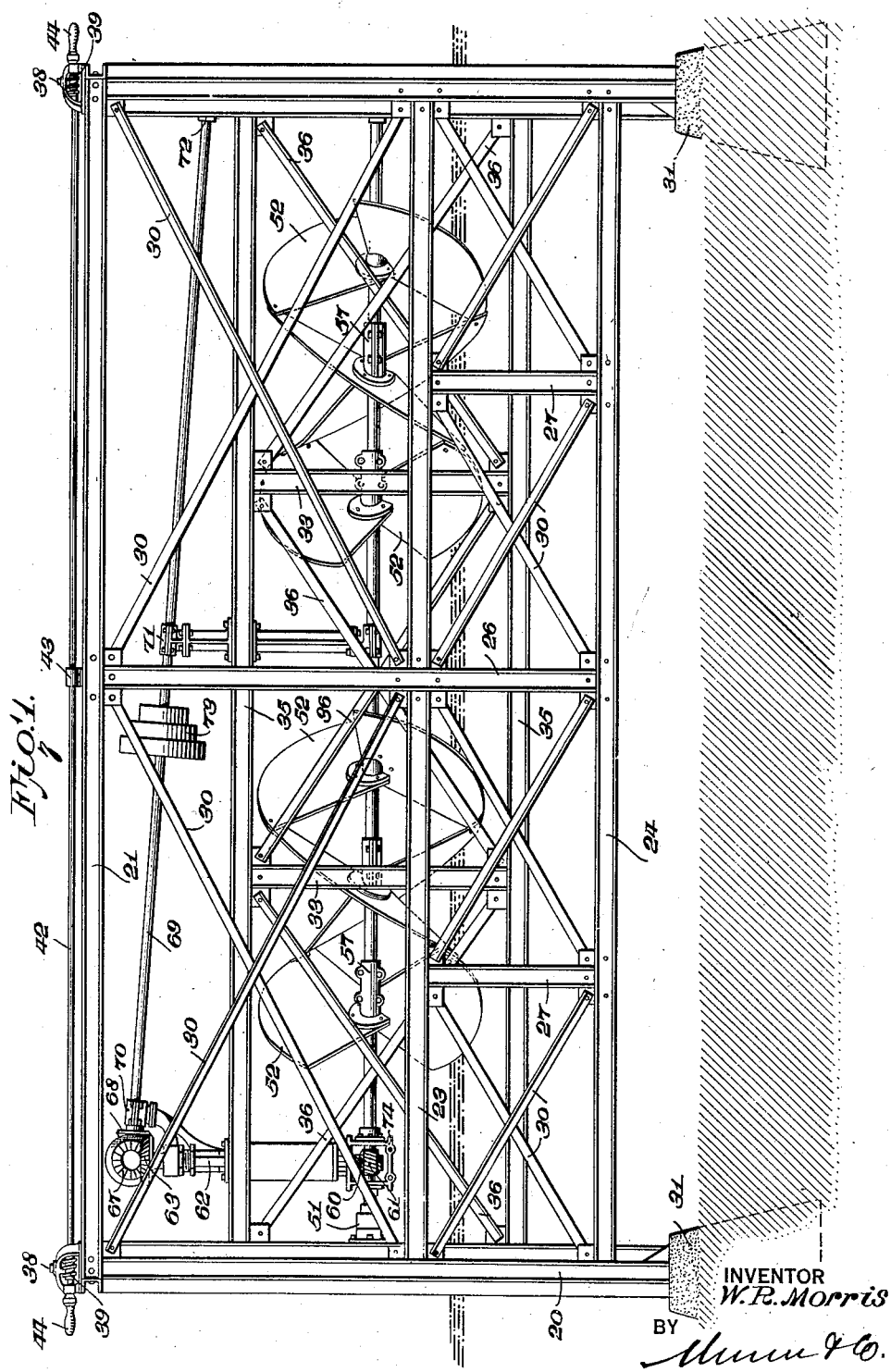
Figure 2:
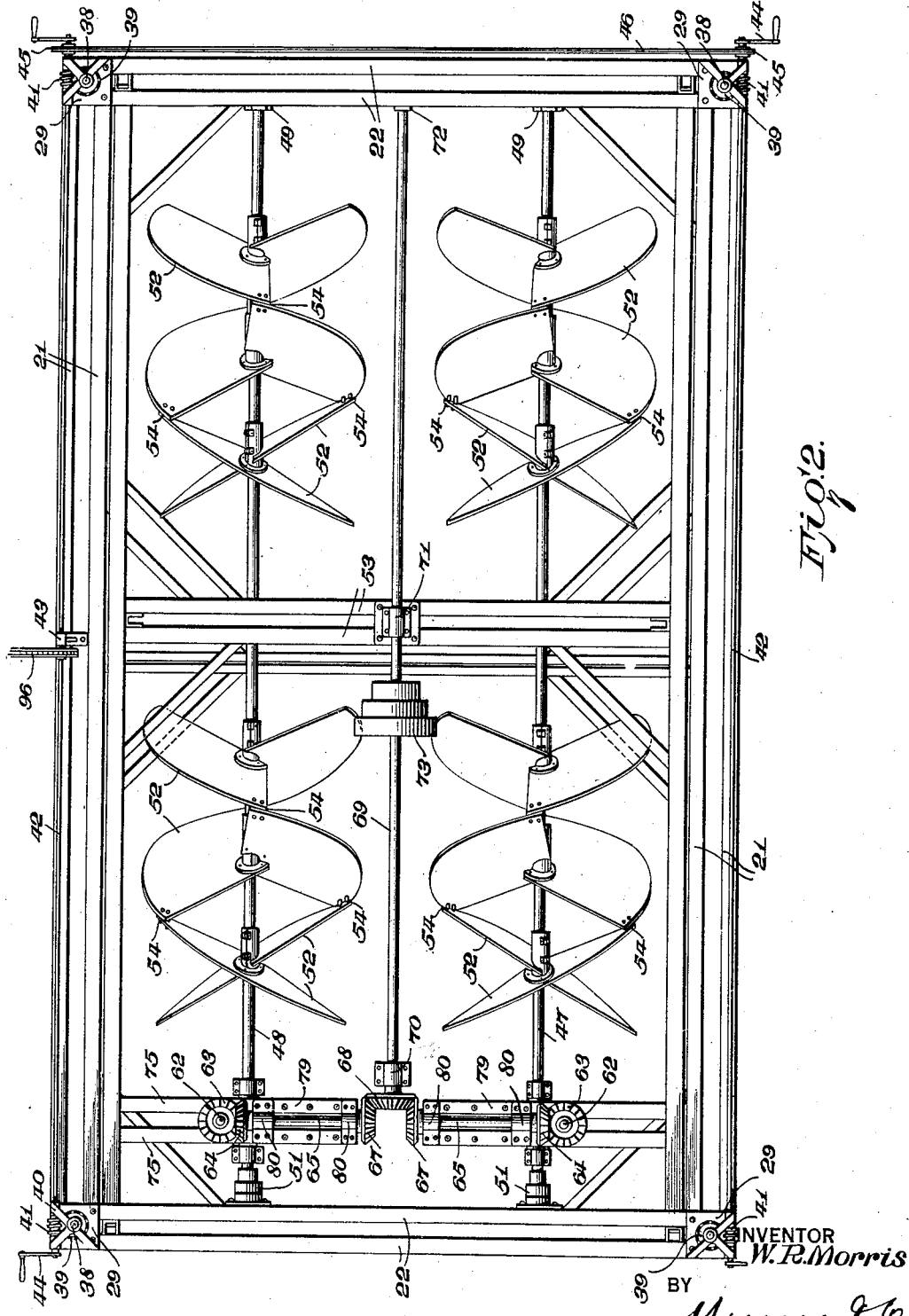

With the foregoing and other equally important objects in view, the invention resides in the certain new and useful combinations, constructions and arrangements of parts as will be hereinafter more fully described, set forth in the appended claims, and illustrated in the accompanying drawings, in which:

Figure 1 is a side elevation of a preferred embodiment of a horizontal type of the invention, Figure 2 is a top plan view thereof, Figure 3 is an end elevation of the same, Figure 4 is an enlarged sectional detail of one of the motor elevating mechanisms, Figure 5 is an enlarged cross-sectional view through one of the impeller shafts, showing a means for securing certain of the impeller blades in position thereon.

Figure 15:
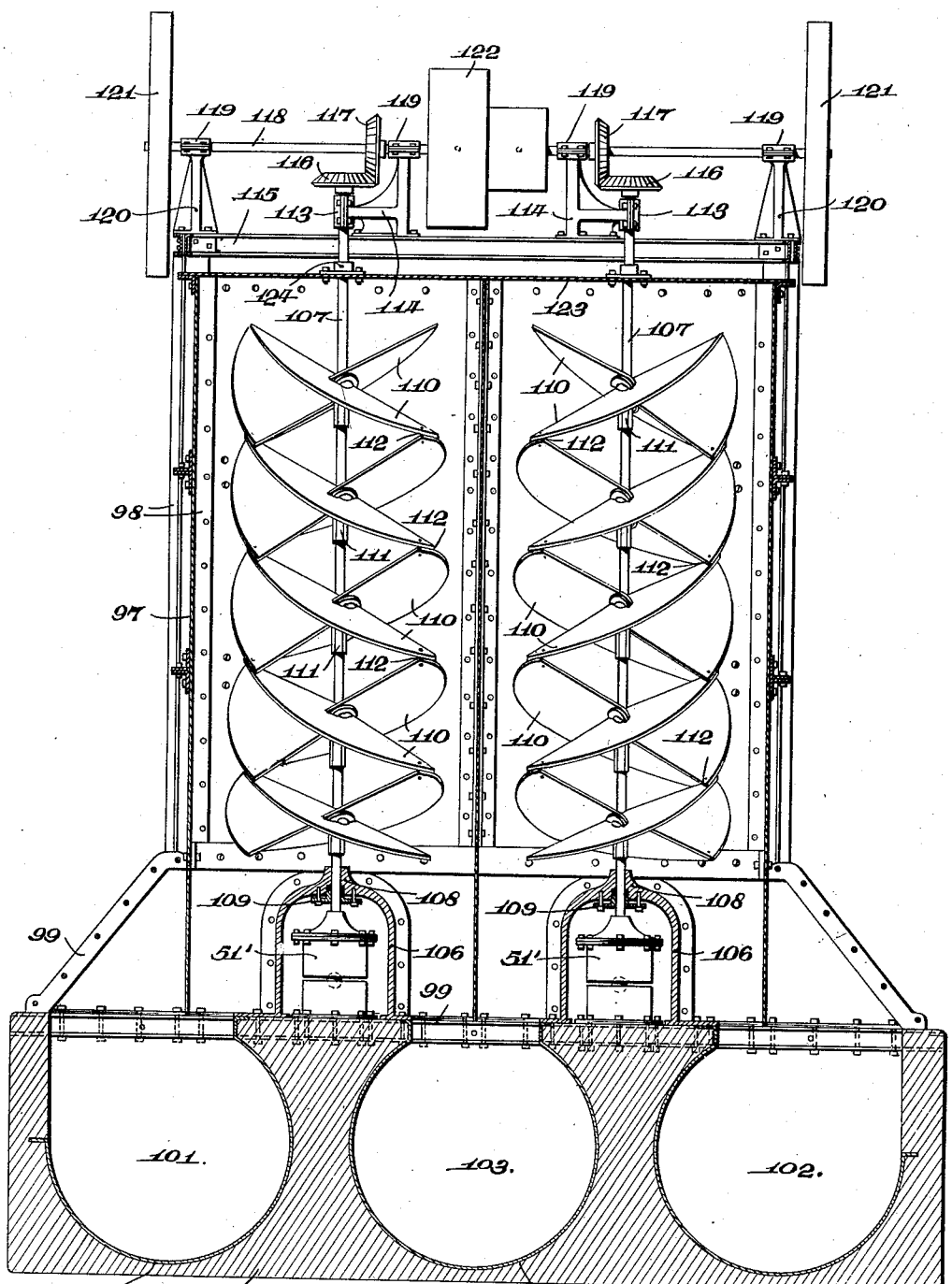

Figure 6 is a perspective view of one of the two part means or brackets employed for securing pairs of adjacent impeller blade sections in position on a shaft, Figure 7 is an enlarged fragmentary detail in elevation, of the means employed for securing adjacent edge portions of the impeller blades together, Figure 8 is a plan view of the detail as shown in Figure 7, Figure 9 is a side elevation of one of the impeller blade attaching bracket sections, Figure 10 is a fragmentary side view of a portion of an impeller shaft, showing the manner of securing a set of the bracket sections in position thereon and the angular disposition of the impeller blades carried thereby, Figure 11 is a side elevation of one of the thrust bearings of the impeller shafts, Figure 12 is a longitudinal section taken on the line 12—12 of Figure 11, Figure 13 is an end elevation of the thrust bearing aforesaid, Figure 14 is a side elevaton of a fragmentary portion of one of the impeller shafts, showing a complete impeller unit as positioned thereon, Figure 15 is a vertical section through a modified form or vertical double type of water motor, and Figure 16 is a similar view of a single impeller unit type thereof.

Referring to the drawings, wherein similar characters of reference designate corresponding parts throughout the several views thereof, and more particularly to Figures 1 to 10, inclusive, and Figure 14, the device, generally, as shown therein, comprises a main supporting frame made up of corner supports 20, each consisting of a plurality of grouped angle members or posts on the inner ends of which are supported the complemental ends of pairs of horizontally disposed spaced parallel longitudinal side frame members 21, and similarly disposed pairs of transverse end frame members 22. Extending parallel to and below the inner of the upper of the side frame members 21 are intermediate side frame members 23, and below these, in similar relation, are lower side frame members 24. Also, below the innermost of the upper end frame members 22 are lower parallel end frame members 25. The horizontal upper, intermediate and lower frame members 21, 22 and 23 at the opposite sides of the frame are connected together by medially arranged and vertically disposed frame members 26, and the intermediate and lower of these side frame members 22 and 23 are further connected together by vertically disposed frame members 27 arranged medially between the oppositely disposed corner posts 20, and the intermediate vertical frame members 26. Also, extending between the upper and lower horizontal end frame members 22 and 25 and connecting the same at points medially thereon is a vertically disposed frame member 28. Secured to the upper sides of the end portions of the pairs of upper end and side frame members 21 and 22 in line with the corner supports or posts 20 are rectangular plates 29, which act to securely brace and strengthen the adjacent parts together. The several corner post units 20 and the intermediate vertical side and end frame members 26, 27 and 28 are securely interbraced by diagonally arranged crossed members or bars 30, substantially as shown. The corner post units 20 are preferably supported on concrete piers or the like 31, built upon or embedded in the bed of a stream.

Mounted within this main supporting frame aforesaid is a vertically movable or adjustable frame consisting of oppositely arranged vertical end or corner and intermediate side members or posts 32 and 33, which are connected together at their upper and lower ends by horizontally disposed upper and lower end and side frame members or bars 34 and 35 respectively, the corner and intermediate vertical members or posts 32 and 33, at the opposite sides of the frame, being suitably interbraced by diagonally arranged cross members or bars 36. Projecting outwardly at the opposite sides of this frame, immediately adjacent the opposite ends of the upper side members or bars 34 thereof, are hangers or supporting eyes 37, which extend into channels formed by the spacing of certain of the angled elements of the corner post units 20, of the main supporting frame, for engagement on the lower ends of screw shafts 38, which depend into the said channels through the corner plates 29 at the upper ends of the corner posts 20. Each of the upper screw threaded ends of the shafts 38 are engaged in the complementally threaded axial bore of a gear or worm wheel 39, which is retained in position on the upper side of the corner plate 29 with which it is associated by an overlying cage or spider 40 secured on the latter for the purpose. The vertically adjustable or movable frame is supported wholly from the lower headed ends 38' of these shafts 38, while the upper screw threaded ends of the latter, after passing inwardly through the axially threaded bores of the gears 39, also pass upwardly through openings formed centrally of the cages or spiders 40.

To effect the raising and lowering adjustments of the movable inner frame manually from any one corner of the main or stationary frame, each of the worm gears or wheels 39 are disposed in mesh with complemental screw elements or gears 41 keyed on the opposite ends of longitudinally extending shafts 42 journalled in bearings 43 at the opposite sides of the main frame, which shafts 42 have their extreme opposite end portions, beyond the screw elements or gears 41, provided with hand cranks 44. Immediately inward of the hand cranks 44 at one end of the motor frame, the shafts 42 are also provided with pulleys or sprockets 45, which are operatively connected together by means of a belt or chain 46, so that rotary movement of one of the shafts 42 will be transmitted to the other thereof, so that, when any one or more of the several hand cranks 44 are manipulated, the vertical screw shafts 38 will be rotated correspondingly to raise and lower the movable frame.

The adjustable or movable frame is provided with a pair of longitudinally extending parallel impeller shafts 47 and 48, each of which has its rear or up-stream end journalled in a suitable bearing 49 carried by one of the intermediate frame members or cross bars 50, disposed horizontally of the front and rear ends of the movable frame, and its forward or down-stream end journalled in a thrust bearing 51, which is mounted at the inner side of the other of the intermediate frame members or cross bars 50 at the front end of the frame.

Each of the impeller shafts 47 and 48 are provided with a series of blades or vanes 52, which are preferably arranged in sets, one set forwardly and one rearwardly of centrally disposed frame members or cross bars 53 extending transversely of the movable frame. The several blades or vanes 52 of each set are also preferably arranged in pairs, and each blade or vane is preferably semi-circular in shape, and the two blades of each pair are disposed in angular relation one with respect to the other and have their lateral edge portions arranged to overlap each other, as at 54, and are secured together at the points of such overlap, as shown in Figures 7 and 8, by means of bolts or the like 55 passing through the portions thereof and through angular clamping elements or collars 56. These blades or vanes 52 are each preferably cut to approximately one-third or slightly greater than one-third of the diameter of the rotor or wheel to be formed by the assembly of each set of the same, which diameter is defined by the arc of curvature of the peripheral edges thereof. As shown, three pairs of blades or vanes 52 are preferably employed in each set to form a complete rotor or wheel section or unit, as a specific example of this particular form of the present invention, but it is to be understood that the number of the individual blades or vanes may be other than the paired arrangement of the same and that a greater or a lesser number of the same may be used in a rotor or wheel section or unit. These blades or vanes 52 of each pair thereof are mounted in position on the shafts 47 and 48 in reversed angular relation, preferably between 28 to 32 degrees out of the perpendicular, so that the lateral edges of adjacent blades or vanes of each pair overlap and their opposite edges are spaced apart, the openings formed by the spaces between these latter edges of each pair thereof being disposed out of alignment at distances approximating one-third of the circumference of the circle defined by the peripheral edges of the same.

The blades or vanes 52 are secured in position on the shafts 47 and 48 by means of two part castings formed to provide hub portions 57, and angularly disposed flanges portions 58. As shown in Figures 6, 9 and 10, the hub portions 57 of the castings are provided with laterally disposed apertured ears or lugs 59, which are secured together by means of bolts or the like when properly positioned on the shafts 47 and 48. The flange 58 of the hub portion 57 of one casting will be of reversed angular relation to that of the hub portion of the other of the castings, so that the blades or vanes 52 will be angularly positioned correspondingly and as hereinbefore explained. These castings overlap at their flanged ends, so that when the blades or vanes 52 are bolted onto them, they set about 1 to 2 degrees off of right angular relation with the shafts 47 and 48, as will be evident when the centers of the flanges are vertical. It will be understood that while tandem or double sets of the blades or vanes 52 are shown on each shaft 47 and 48, only one or more than the two sets, so illustrated, may be employed, depending upon the power that it is desired to develop. The completed assemblies of the sets of blades or vanes 52 on the shafts 47 and 48 are preferably arranged to cause a rotation of one of the shafts in a direction opposite to the direction of the other.

Power is to be taken from each of the rotor or wheel shafts 47 and 48 by means of a worm gear 60 (Figure 1) keyed on the same and arranged in mesh with a similar gear 61 carried at the lower end of a vertical shaft 62, which carries at its upper end a beveled gear 63 disposed in mesh, in turn, with a complementally beveled gear 64, keyed on the outer end of a transversely and horizontally disposed shaft section 65 journalled in suitable bearings carried on upper cross members 66 of the vertically movable or adjustable frame of the device. The inner end of each shaft section 65 carries a beveled gear 67 commonly meshing with a bevelled gear 68 keyed on a power shaft 69 journalled longitudinally at the upper side of the vertically adjustable or movable frame in suitable bearings 70, 71 and 72. Power is delivered from the longitudinal shaft 69 from a stepped pulley or the like 73. As shown, the intermeshing worm gears 60 and 61 of each shaft 47 and 48 are preferably enclosed within and adjustable boxing 74. As shown in Figure 4, the adjustable boxes or journals 74, of the worm gears 60 and 61 on the impeller shafts 47 and 48, are supported from a pair of spaced parallel bars or beams 75 supported transversely of the upper side of the movable frame by means of hangers or the like 76 which carry a horizontally extending supporting bar or member 77 at their lower ends, while the upper ends of the vertical shaft sections 62, carrying the worm gears 61 at their lower ends, are journalled at their upper end portions in bearings 78 carried at the outer sides of heavy support castings 79 mounted on the upper sides of the transverse cross members or bars 75. These support castings 79 are preferably U-shaped in side elevation, and are provided with adjustable bearings 80 at the upper ends of their opposite leg portions for the journalling therein of the horizontal shaft sections 65. The bearings 70 for the forward or down-stream end of the power shaft 73 is carried at the upper end of an arm or bracket secured to and between the bearing castings 79, as is clearly shown in Figure 3.

As shown in Figures 11, 12 and 13, this thrust bearing 51 consists of the two cylindrical half sections 81 and 82, which are provided with annular attaching flanges 83 and 84 respectively, at their opposite outer ends. The two sections 81 and 82 are in the form of hollow bodies open at their opposed ends, and housed within each section are a pair of oppositely stepped or shouldered bearing sections 85 and 86, the opposite stepped or shouldered portions of which are formed to provide annular grooves to seat within and between the same a series of ball bearings 87. After the stepped or shouldered portions 85 and 86 are placed in position, the open ends of the sections 81 and 82 are closed by plates 88. These plates 88 are apertured at their centers and the opposed faces of the bearing sections 86 are recessed in line with these openings, so that a single ball bearing 89 is seated in the openings and recesses in a manner to maintain the sections 81 and 82 in slightly spaced relation, substantially as shown. The inner bearing sections 85 are open at their centers to seat within the same the reduced ends of the bearing sections 86, and interposed between these reduced ends of the latter section and the end walls of the hollow sections 81 and 82 are cushioning elements 90. The cushioning effect of these elements 90 is augmented by the provision of an annular groove 91 in the opposed end face of the reduced end portions of each of the bearing sections 86 and of openings 92 leading to atmosphere outwardly of the end walls of the hollow sections 81 and 82. Suitable lubricating devices 93 are provided on each hollow section 81 and 82 for supplying a lubricant to the bearing sections 85 and 86, and the ball rods therebetween. A bearing plate 94 is bolted or otherwise secured at the outer end of the front section 81, and has a central enlargement 95, which is recessed to receive the forward or down-stream end of one of the impeller shafts 47 and 48, as hereinbefore indicated. The opening or duct 90, leading from the front end wall of the bearing section 81 is aligned with a similar opening or duct formed in the bearing plate 94, which, in turn, opens into the inner wall of the recess aforesaid, substantially as shown.

In operating the motor, the stationary frame of the same is set on the piers 31 in the bed of a stream, and preferably in a manner that the adjustable frame will lift the impellers out of the path of the current when in its elevated position. When it is desired to deliver power from the pulley 73, the adjustable frame will be lowered, by manipulating the hand cranks 44 in proper direction of rotation for the purpose, and until the impellers are submerged, or partially submerged, to a depth sufficient to develop the required power. When submerged to the lowest depth permissible by the lower limit of movement of the movable frame, the motor will develop maximum power, as will be readily apparent, and the amount of the power will be varied correspondingly with the raising and lowering of the adjustable frame to submerge the rotors or wheels to a greater or lesser degree. As shown in Figures 1 and 2, in lieu of hand power being applied to the raising and lowering mechanism of the movable frame, power from the motor itself, or from any other source, may be applied to one of the longitudinal shafts 42 for the operation of the mechanism, by any suitable means, such as the sprocket and chain drive or the like 96, when the other shaft 42 will be driven in a reversed direction through the crossed belt or chain connection 46 at the rear or up-stream end of the motor.

Referring now to Figures 15 and 16, wherein is shown a vertical type of the hydraulic motor, one or more cylindrical caissons or penstocks 97, preferably of heavy sheet material suitably reinforced interiorly and exteriorly by means of an angle iron framing or the like 98, are provided, and have their lower ends supported on a horizontal iron frame work 99, which, in turn, is supported on a concrete or masonry foundation 100. Formed in this foundation 100 are outer spillways 101 and 102 and an intermediate spillway 103, the latter being common to the lower open ends of the caissons 97, when two of the same are employed. These spillways 101, 102 and 103 are preferably lined with cylindrical or semi-cylindrical casings 104, also of heavy sheet metal to protect the concrete or masonry structure of the foundation from the usual wear and tear of the force of water passed downwardly of the caissons or penstocks 97, and discharged into the several spillways.

The intermediate portions of the foundation 100, lying between the spillways 101, 102 and 103, are disposed diametrically of the lower ends of the caissons or penstocks 97 to assure of the solid and substantial support to the corresponding portions of the frame work 98. Secured in position on these supported portions of the framework 98, and centrally within the lower ends of the caissons or penstocks 97, are thrust bearings 51', as hereinbefore described in detail, and these bearings are housed within water-tight casings 106. Rising centrally within the caissons or penstocks 97 are impeller shafts 107, each of which have their lower end portions journalled in apertured bosses 108, formed in the upper sides of the casings 106, and their extreme lower ends engaged in the supporting sockets of the upper end portions of the thrust bearings 51'. The inner or lower sides of the apertures of the bosses 108 are counterbored to receive a packing to surround the inserted end of the shafts 107, which is held in place and under proper pressure by follow plates or the like 109 removably secured in position by means of bolts or the like as shown.

Each of the shafts 107 are provided with a set of propeller blades or vanes 110, of heavy sheet metal, which are preferably cut, as in the first instance of the invention, to segmental form of an arc slightly greater than one-third of the total circumference of a circle defined by their radius, or say to approximately one-hundred and twenty-four degrees (124°), and each set of the same will preferably be made up of any desired number of sections or groups of three blades or vanes each. Special three part casings 111, of similar construction to the castings 57 of the previously described form of the invention, will be secured on the shafts 107, with the flanged portions of each part angularly disposed to symmetrically locate the blades or vanes of each section or group in the same plane about the shafts. The several sections or groups of blades or vanes 110 of each set of the same are positioned on the shafts 107 in a manner that adjacent edge portions of adjacent sections or groups will overlap, as at 112, and these portions will be secured together, after the manner of the similarly overlapping portions of the blades or vanes 52 of the first form of the invention. By this arrangement of the three blades or vanes in each section or group thereof, the combined areas of the same will be in effect a complete water wheel unit, and by varying the number of these units on a shaft, the power to be developed will be correspondingly varied.

The upper end portions of the shafts 107 are journalled in suitable bearings 113 forming parts of castings 114, which are secured on the upper sides of horizontal frame members 115, and are provided at their extreme upper ends, above the bearings 113, with bevel gears 116 arranged in mesh with similar gears 117 keyed on a power transmitting shaft 118. This shaft 118 is journalled in horizontally alined bearings 119 carried at the upper sides of the castings 114, and at the upper ends of standard castings 120 rising from the opposite ends of the upper horizontal framing members 115. The opposite ends of the power shaft 118 preferably have fly wheels 121 keyed thereon at the outer sides of the bearing supporting standards 120, wihle a stepped pulley or the like 122 is keyed to the shaft 118, preferably at its center and between the bearing castings 114, which are spaced to either side of the vertical center of the frame 98, substantially as is shown in Figure 15. The upper ends of the caissons or pentstocks 97 may be enclosed by top walls 123, in which case the upper end portions of the shafts 107 will be passed upwardly through apertures therein and upwardly nippled bosses or the like 124 secured on the upper sides of the top walls 123 at the said apertures therein.

As shown in Figure 16, water will be admitted to the caissons or pentstocks 97 at the upper ends thereof and at one side of the same, and at points below the top walls 123, but above the uppermost sections or groups or the blades or vanes 110 by means of a flume or raceway 125, or in any other suitable or desired manner, depending upon the location and manner of the installation of this type of motor with respect to a water supply. Power will be taken from the shaft 118 at the pulley 122 by means of the wrapping connector or endless belt 126 for any desired purpose or use.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. In a device of the class described, an impeller, comprising a shaft, a plurality of vanes arranged in sets, with the vanes of each set disposed in spaced and reversed angular relation one with respect to the other along said shaft, certain of the vanes of each set having portions of their peripheral edges abutting, and means for securing the abutted edge portions together.

2. In a device of the class described, an impeller, comprising a shaft, a plurality of vanes arranged in sets with the vanes of each set disposed in spaced and reversed angular relation one with respect to the other along said shaft, certain of the vanes of each set having radial edge portions disposed in overlapping relation and abutting at their outer ends and means for connecting the abutted edge portions together.

3. In a device of the class described, an impeller comprising a shaft, a plurality of sector shaped vanes arranged in pairs, with the vanes of each pair disposed in angular relation one with respect to the other along said shaft to form spiral flights of opposite pitch, and means interconnecting said vanes at the adjacent peripheral edge portions thereof.

4. In a device of the class described, an impeller comprising a shaft, a plurality of sector shaped vanes arranged in pairs and in alternating angular relation with respect to each other along said shaft, the vanes of each pair thereof having angularly arranged radial edge portions disposed in overlapping relation and abutted at their outer ends, means for securing said overlapping radial edge portions together at their points of abutment, and means for interconnecting the peripheral edge portions of adjacent vanes of each pair thereof to form a completed rotor unit of two spiral flights of opposite pitch.

5. In a device of the class described, an impeller comprising a shaft, a plurality of sector shaped vanes arranged in pairs, with the vanes of each pair disposed in reverse angular relation, one with respect to the other, along said shaft, the vanes of each pair thereof having angularly arranged edge portions disposed in angular relation and abutted at their outer ends, the arc of curvature of each of the said vanes being slightly greater than one-third of the circumference of a circle defined by such arc, whereby the active surface of each vane will approximate one-third of the area of the defined circle when the adjacent of the radial edges of the several vanes are overlapped, and means for securing the adjacent peripheral edges of the overlapped radial edge portions thereof together.

6. A rotor for current motors and the like, comprising a shaft, pairs of vanes of sector shape secured on said shaft, one of the vanes of each pair thereof being arranged in reversed angular relation to the other, the vanes of one pair being angularly offset about said shaft to place corner portions of the same in abutting relation to corner portions of the vanes of adjacent pairs thereof whereby two spiral vane flights are presented to the water flow in each revolution of the rotor, and means for securing the abutted corner portions of the vanes together.

7. A rotor for current motors and the like comprising a shaft, pairs of split castings adapted to be secured about said shaft, reverely angled flanges carried at the ends of the casting parts and vanes carried by said flanges.

8. A rotor for current motors and the like comprising a shaft, pairs of longitudinally split castings adapted to be secured about said shaft, reversed angled flanges formed at the ends of the casting parts and vanes carried by said flanges.

9. A rotor for current motors and the like, comprising a shaft, pairs of longitudinally split castings adapted to be secured about said shaft, reversely angled flanges formed at adjacent ends of the casting parts, and vanes carried by said flanges.

10. A rotor for current motors and the like comprising a shaft, pairs of longitudinally split castings adapted to be secured about said shaft, reversely angled flanges formed at one and the same end of each of said casting parts, and vanes carried by said flanges.

WILLIAM ROY MORRIS.